United States Patent [19]
Wilkins et al.

[11] 3,907,646
[45] Sept. 23, 1975

[54] MEASUREMENT OF GAS PRODUCTION OF MICROORGANISMS

[75] Inventors: Judd R. Wilkins, Hampton; Albin O. Pearson, Grafton; Stacey M. Mills, Hampton, all of Va.

[73] Assignee: The United States of America as represented by the National Aeronautics and Space Administration Office of General Counsel, Washington, D.C.

[22] Filed: July 24, 1974

[21] Appl. No.: 491,416

[52] U.S. Cl. .......................................... 195/103.5 R
[51] Int. Cl.² .......................................... C12K 1/04
[58] Field of Search ................ 195/103.5 R, 103.5 P

[56] References Cited
UNITED STATES PATENTS
3,743,581  7/1973  Cady et al. .................... 195/103.5 R Primary Examiner—A. Louis Monacell
Assistant Examiner—Robert J. Warden
Attorney, Agent, or Firm—Howard J. Osborn; Wallace J. Nelson; John R. Manning

[57] ABSTRACT

A simple apparatus and method is disclosed for measuring gas production by microorganisms using a pressure transducer to sense pressure buildup by members of the Enterobacteriaceae group of bacteria. The test system consists of a 5.0 psid pressure transducer and a pressure equalizer valve attached to the metal cap of a 20 × 150 mm test tube with gas pressure being recorded on a strip-chart recorder.

6 Claims, 6 Drawing Figures

MEASUREMENT OF GAS PRODUCTION OF MICROORGANISMS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

A number of techniques are presently available for measuring gas production of microorganisms. Recent publications described a radiometric technique for detecting bacteria in blood or urine samples based on the formation of $^{14}CO_2$ from the metabolism of $^{14}C$-glucose. As many current gas measuring methods are rather elaborate, interest has centered around the development of simple methods such as a syringe to collect the gas produced by rumen microorganisms, or by submerging a sealed bag, containing inoculated fruit, in water and measuring the gas volume by the displaced water volume. Apart from the questionable accuracy in measuring gas pressure by these methods, the need to manually record the data is an obvious disadvantage. There is thus a definite need in the art for new apparatus and methods for measuring gas production of microorganisms as an aid in research, in clinical laboratories, and for environmental pollution studies.

Gas-producing microorganisms of the Enterobacteriaceae are responsible for the majority of urinary tract infections. Counts must exceed 100,000 cells/ml before a urinary infection is established and by the conventional plate-counting method now employed in diagnostic procedures, periods of at least 24 hours are required to make an accurate diagnosis. By utilizing the transducer method of the present invention, the number of microorganisms in a sample can accurately be determined within 5 hours or less.

The pressure transducer technique of the present invention is also more accurate and faster than the presently used MPN (Most Probable Number) procedure used to determine the number of coliforms in water samples.

This invention also has potential application in the alcoholic beverage industry to check on the fermentation capabilities of yeast cultures and also as an aid in monitoring various stages of production.

It is therefore an object of the present invention to provide a method for measuring gas production, using a pressure transducer to sense gas pressure buildup.

Another object of the present invention is an apparatus for measuring microorganism gas production that is easy to assemble and use, and has the added advantage that the rate of gas produced can be measured automatically and accurately.

A further object of the present invention is a transducer measurement method to study gas production by members of the Enterobacteriaceae group of bacteria.

An additional object of the present invention is a method of accurately and rapidly determining the number of coliforms in a specific sample.

SUMMARY OF THE INVENTION

The foregoing and other objects of the present invention are attained by providing a differential pressure transducer and a needle fitted to a metal cap which is machined to hermetically seal a conventional test tube. The inlet tube of the transducer and the needle are inserted through the cap and soldered into place. A silicone rubber gasket is positioned inside the cap to insure a gas-tight seal with the test tube. The needle is provided with an attached on-off valve to provide an equalization of the pressure inside the test tube with ambient pressure after the cap is positioned in place.

A culture to be tested is positioned inside the test tube and the tube and transducer assembly placed within an incubator with the electric output of the transducer being connected to a strip chart recorder. A suitable direct current supply is used to energize the transducer. Measurements on the recorder are made on the 50-mV scale and, in addition, an a.c.-d.c. digital voltmeter may be used to read millivolt responses directly. The linear relationship between inoculum size and time-to-pressure buildup permit quantification of the number of microorganisms in a sample.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein:

FIG. 3 is an enlarged view of the pressure cap, transducer and equalizer valve arrangement;

Figure 1:
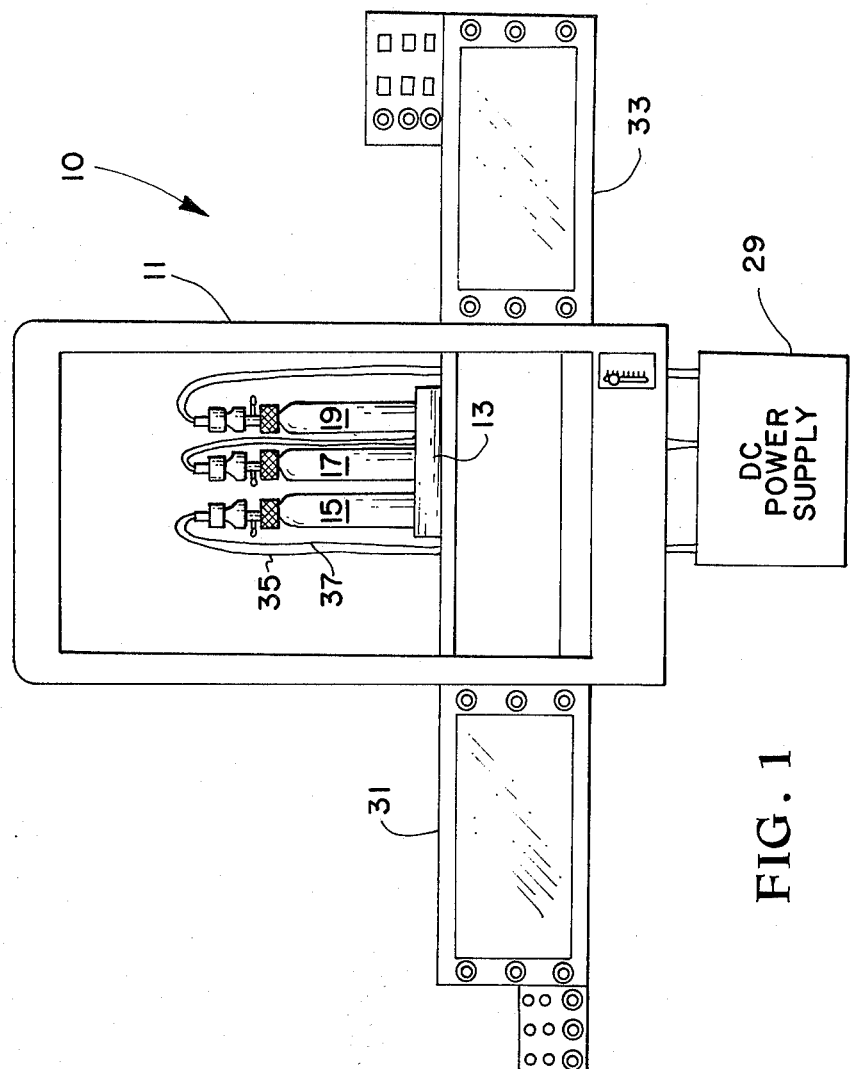
FIG. 1 is a view of the general apparatus employed in measuring microorganism gas production according to the present invention.
Figure 2:
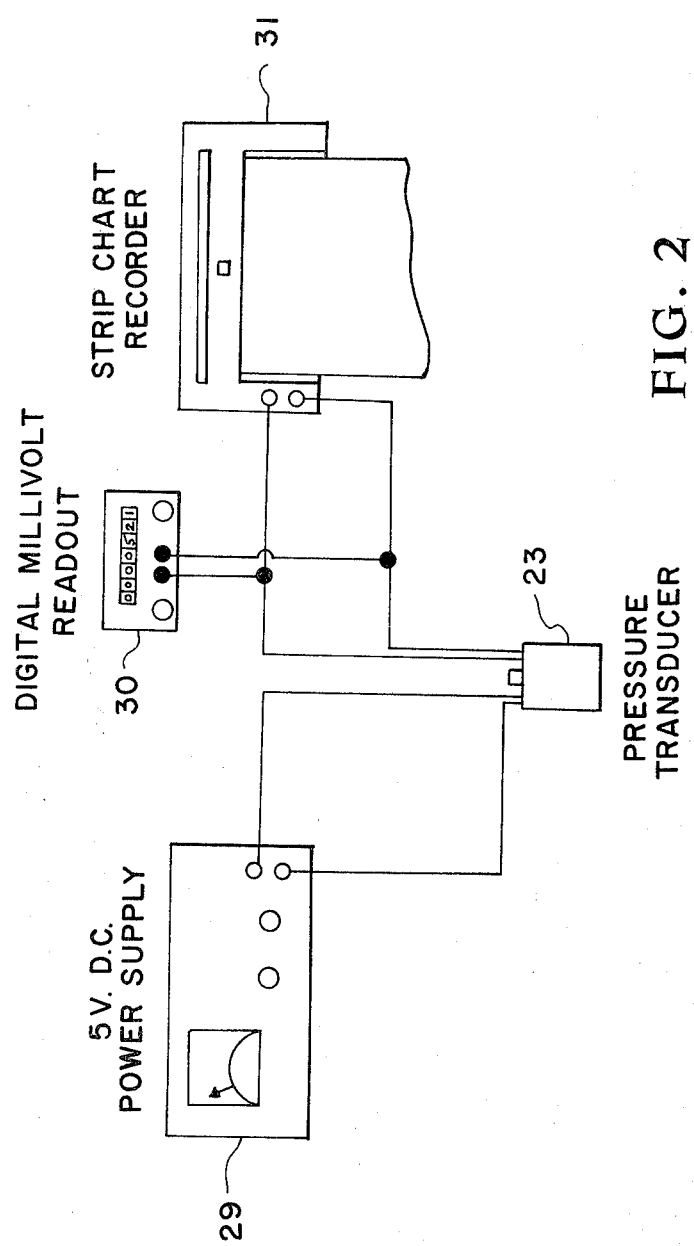
FIG. 2 is a view of the gas measuring apparatus with parts schematically shown.

Referring now to the drawings and more particularly to FIGS. 1 and 2, the apparatus for measuring gas production by microorganisms according to the present invention is generally designated by reference numeral 10. Apparatus 10 includes an incubator oven 11 heated by a suitable electrical source (not shown). Incubator 11 houses a support rack 13 designed to hold a plurality of test tubes designated by reference numerals 15, 17 and 19. Although only three test tubes are shown in the illustrated embodiment, it is readily apparent that any reasonable number of tubes could be employed in a test. Rack 13 may be a stationary block serving only to hold the tubes in position or may be attached to a conventional shaker unit disposed within oven 11 to provide a controlled number of oscillations/minute to the incubated sample disposed in the test tubes 15, 17 and 19. One suitable oven is available from the Precision Scientific Co. Chicago, Ill., under the name of Precision Thelco Incubator. For brevity, the details of only one test tube 15 will be described. As shown more particularly in FIG. 3, a metal cap 21 is machined to fit test tube 15 (in this instance, a 20 by 150 mm tube) and drilled to accept a 5.0 psid strain gage transducer 23 provided with an integrally attached 20 gage needle inlet 25. Transducers of this type are available from Stratham Instruments, Inc., Oxnard, Cali. The inlet needle 25 of transducer 23 is inserted through cap 21 and soldered in place. A tight silicon rubber gasket (not shown) is positioned around needle 25 inside cap 21 to form a gas-tight seal. A one-way valve 27, such for example a Luer-Lok one-way stopcock, is attached in fluid-tight relationship with the sidewall of needle 25 and serves to permit equalization of pressure inside the test tube 15 after cap 21 is positioned in place. The electrical output of transducer 23 is connected to a suitable d.c. power supply 29 (FIG. 1) and strip recorders 31, 33 via suitable electrical leads 35, 37 and others (not shown). Suitable strip chart recorders are available as model 194, Honeywell Industrial Division, Fort Washington, Pa. All measurements on the recorders 31 and 33 may be made on the 50 mV scale. In addition to recorder monitoring, an a.c.-d.c. digital reading voltmeter 30 may be employed to read mV response directly.

Gas samples for $CO_2$ analysis may be obtained by attaching a syringe to the pressure equalizer valve 27 and removing an increment of the head-space gas. $CO_2$ measurements may be accomplished, for example, by an F&M 810 gas chromatograph (available from Hewlett-Packard, Avondale, Pa. equipped with a thermal conductivity detector and a 0.25 inch (6.35 mm outside diameter) by 12 ft. (3.66 M) stainless steel column packed with Porapak Q (a trade name of the Waters Associates, Inc.) for porous polystyrene beads.

The cultures used in this invention were obtained from the American Type Culture Collection (Rockville, MD); *Escherichia coli* 12014, *Enterobacter aerogenes* 13882, and *Citrobacter intermedium* 6750. Cultures were maintained at 5°C. on Trypticase soy agar slants (TSA, BBL) and transferred monthly. Inocula for the gas pressure measurements were prepared by making 10-fold dilutions of a 24 hr Trypticase soy broth culture (TSB, BBL) in sterile 0.05% peptone broth and adding 1 ml of appropriate dilutions of 9 ml of media prewarmed to experimental conditions. Viable counts were made by spreading appropriate dilutions from the 10-fold series on TSA and counting colonies after 24 hr incubation at 35°C. Lauryl tryptose broth (LTB, Difco), Eykman lactose medium (BBL), Phenol red broth base with 1.0% glucose (Difco), and Brilliant Green bile broth (BBL) were used in a specific experiment of the present invention.

Figure 4:
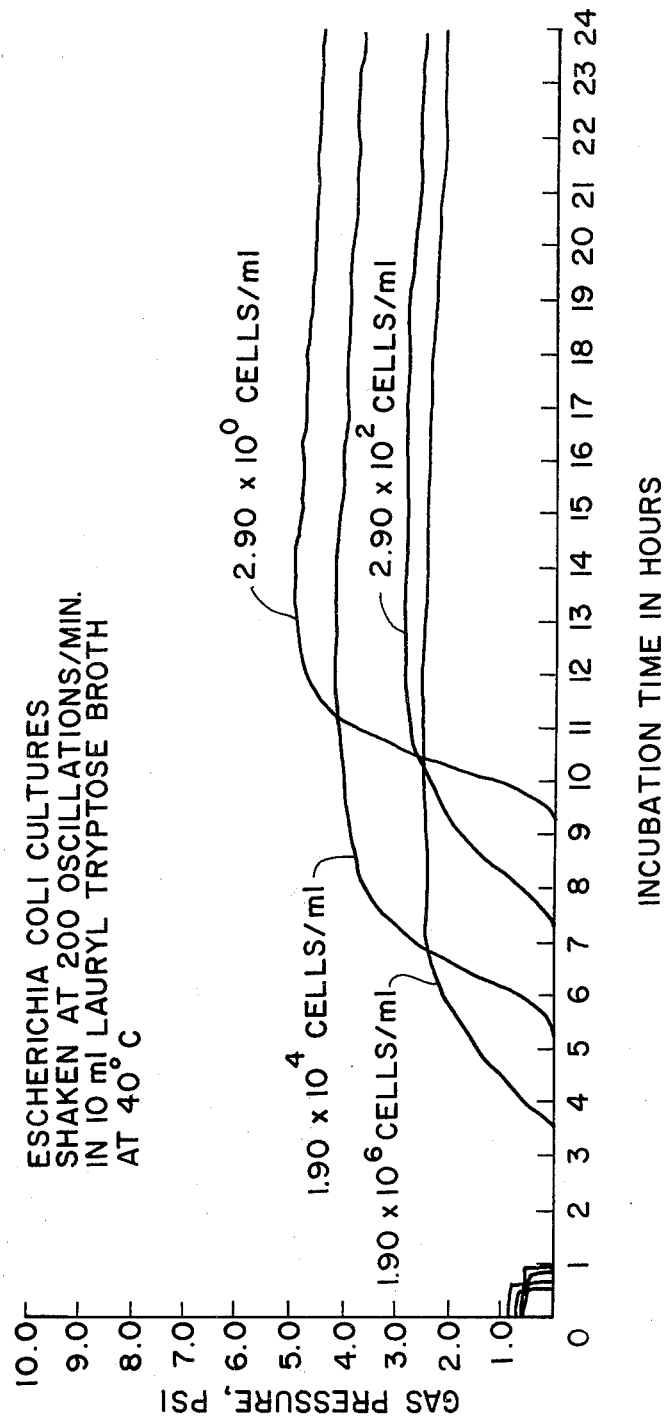
FIG. 4 is an exemplary, typical gas pressure response semi-logarithmic curve obtained by the present invention.
Figure 5:
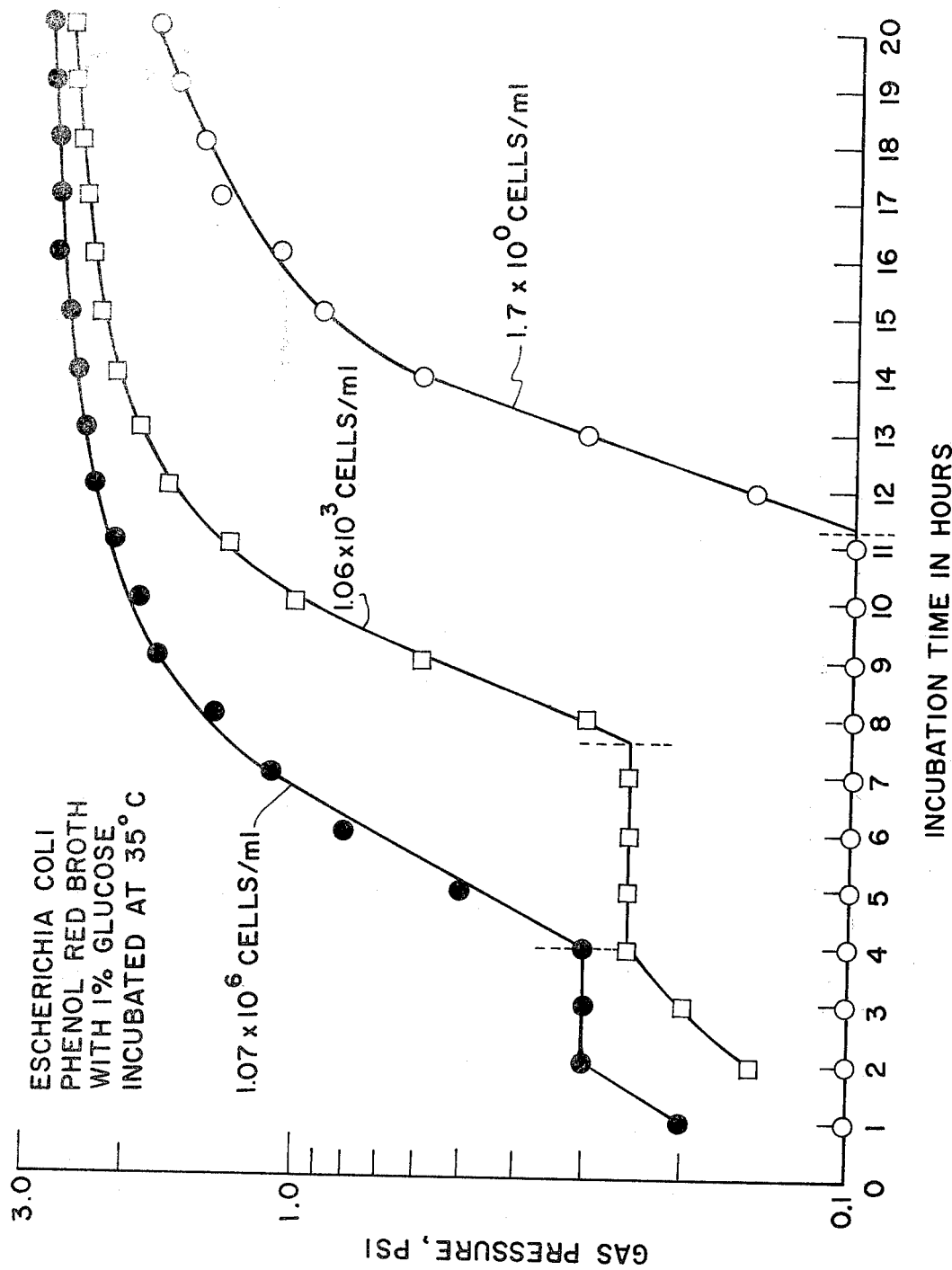
FIG. 5 shows curves obtained for various concentrations of one microorgansim when grown in a specific media.

A typical S-shaped gas pressure response curve for various concentrations of *E. coli* grown in Lauryl tryptose broth and Phenol Red broth base containing 1% glucose is shown, respectively, in FIGS. 4 and 5. This basic curve was also consistently observed for a wide combination of bacteria and growth conditions. Characteristically, the sequence of events after inoculation were: (i) a lag period with no increase in gas pressure except for minor fluctuations of 0.1 to 0.2 psi, (ii) end of lag period marked by a rapid buildup in pressure lasting for about 4 to 5 hours, and (iii) a leveling off period. The maximum amoun of gas produced ranged from 0.2 to 0.4 psi/ml depending on the organism and growth conditions.

Length of the lag period, i.e., the time between inoculation and rapid buildup in pressure, was markedly influenced by inoculum level (Table I). When the data were plotted and a line fitted by the method of least squares (correlation coefficient − 0.9785), a linear relationship existed between inoculum level and length of the lag period. Similar relationships were also observed for other members of the Enterobacteriaceae group.

TABLE I

Effect of Inoculum on Length of Lag Period for *Escherichia coli* Grown in Phenol Red Broth Base Containing 1% Glucose

| Lag Period Hrs. | Mins. | Inoculum, Cells/ml |
|---|---|---|
| 1 | 0 | $1.08 \times 10^7$ |
| 3 | 24 | $1.24 \times 10^6$ |
| 4 | 0 | $1.24 \times 10^6$ |
| 5 | 36 | $1.36 \times 10^5$ |
| 6 | 0 | $1.11 \times 10^4$ |
| 6 | 24 | $1.11 \times 10^4$ |
| 7 | 12 | $1.06 \times 10^3$ |
| 8 | 0 | $1.52 \times 10^2$ |
| 8 | 24 | $1.52 \times 10^2$ |
| 9 | 24 | $1.08 \times 10^1$ |
| 11 | 36 | $1.70 \times 10^0$ |

Figure 6:
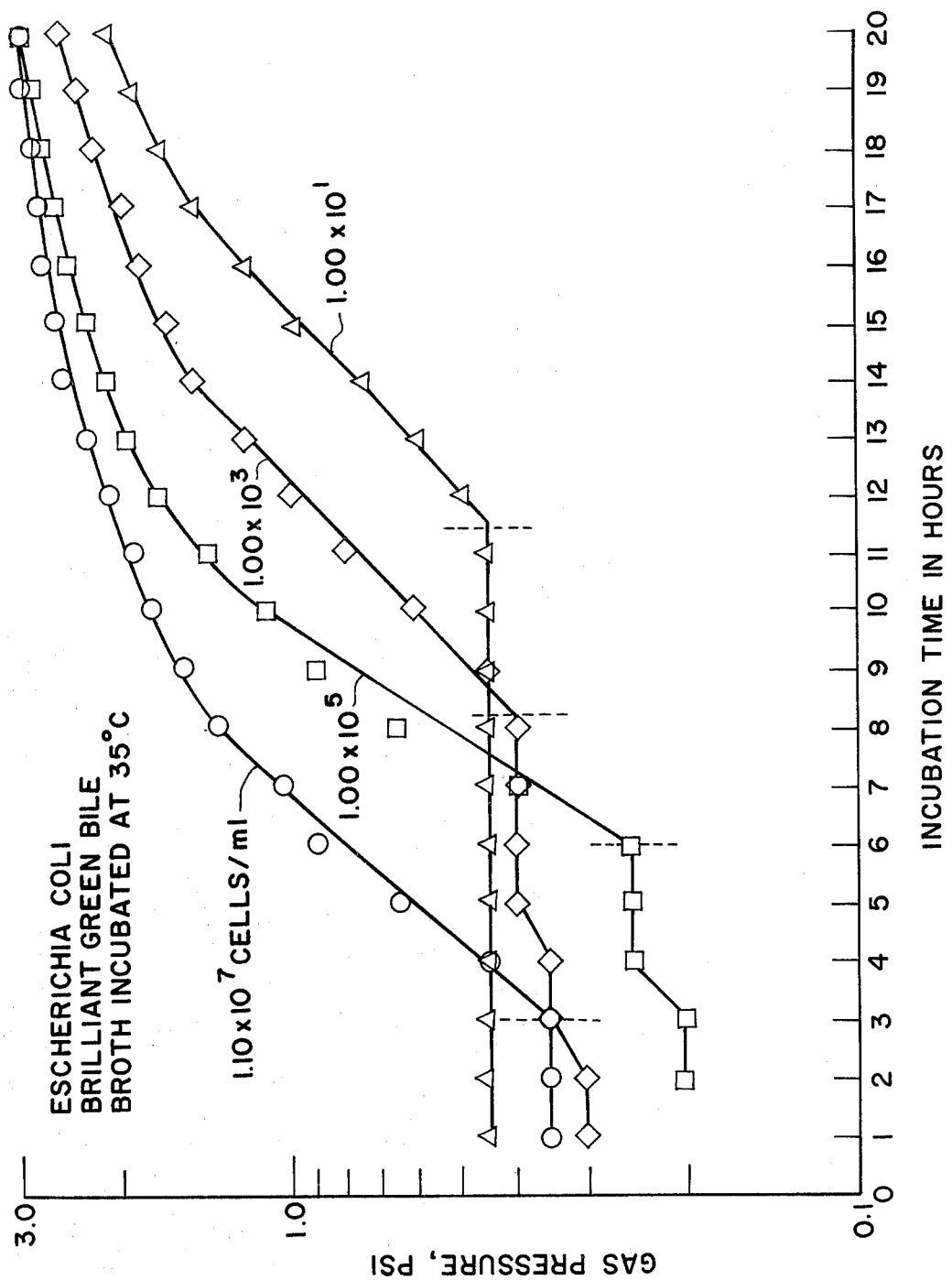
FIG. 6 is similar to FIG. 4 showing curves obtained for various concentrations of the same microorganisms in a different growth media.

The growth media did influence length of the lag period for *E. coli* (Table II) and at lower cell concentrations, the pressure buildup period was much steeper for *E. coli* grown in Phenol Red broth base containing 1% glucose than in Brilliant Green Bile broth (FIGS. 5 and 6).

TABLE II

Effect of Media on Length of Lag Period for *Escherichia coli*

| Lag Period Hrs. | Mins. | Eijkman Lactose Broth | Lauryl Tryptose Broth |
|---|---|---|---|
| 2 | 36 | | $5.10 \times 10^6$ |
| 3 | 0 | $5.10 \times 10^{6=}$ | |
| 3 | 12 | $5.60 \times 10^6$ | |
| 6 | 36 | | $5.00 \times 10^3$ |
| 6 | 36 | | $5.00 \times 10^3$ |
| 7 | 24 | $3.70 \times 10^3$ | |
| 7 | 24 | $3.80 \times 10^3$ | |
| 7 | 36 | $5.00 \times 10^2$ | |
| 10 | 0 | | $4.00 \times 10^0$ |
| 10 | 24 | $4.00 \times 10^0$ | |
| 10 | 24 | $4.90 \times 10^0$ | |

*Inoculum, Cells/ml.

A number of studies were made on the relationship between inoculum level and the time to rapid buildup in pressure (lag period). For the organisms tested, with each 10-fold decrease in inoculum, length of the lag period increased about 60–75 minutes. It was also determined that the cell concentration at the time of a rapid buildup in pressure was $10^7$ to $10^8$ cells/ml. One stude was conducted to relate cell density and $CO_2$ concentration (ppm) with gas pressure (psi) and the results are shown in Table III.

TABLE III

Effect of Cell Density and $CO_2$ Concentration on Gas Pressure *E. coli* in Phenol Red broth containing 1% glucose

| Time (Hrs) | Viable Count/ml | | $CO_2$ Concentration (ppm)*** | Gas Pressure (psi) |
|---|---|---|---|---|
| | Control* | Test** | | |
| 0 | $1.37 \times 10^5$ | $1.37 \times 10^5$ | 650 | 0 |
| 2.0 | $7.00 \times 10^5$ | $8.60 \times 10^5$ | 850 | .40 |
| 5.5 | $2.40 \times 10^8$ | $2.77 \times 10^8$ | 4,000 | .40 |
| 7.0 | $3.60 \times 10^8$ | $4.00 \times 10^8$ | 15,000 | 1.00 |

*Normal Screw cap tube
**Gas tight tube
***Measured in an F & M model 810, Gas Chromatograph It is of interest to note the sharp increase from $4 \times 10^3$ ppm of $CO_2$, at the beginning of the rapid buildup in pressure (0.4 psi), to $1.5 \times 10^4$ ppm $CO_2$, 1.5 hours later, when the gas pressure was 1.0 psi. The cell concentrations during this 1.5 hour period increased from $2.77 \times 10^8$ to $4.00 \times 10^8$ cells/ml. In an attempt to increase the sensitivity of measuring gas pressure during the lag period, a 0 to 0.5 psi transducer was used but the results did not differ markedly from the 0 to 5.0 psi transducer. As initial tests showed no differences in the response curves for washed or unwashed cells, especially length of the lag period, these studies were conducted with unwashed cells. In addition, no differences were noted in length of the lag period when the cultures were tested in 5, 10, 15 and 20 ml of LTB or in 10 ml of various media such as Phenol red broth supplemented with 1% lactose, Brilliant green lactose broth and Eijkman lactose broth.

Although various incubation conditions did not influence length of the lag period, the shape of the gas pressure response curves were markedly altered. When stationary cultures were tested in a water bath or incubator, the slope of the rapid buildup in pressure period was gradual with a steady increase in pressure. On the other hand, when cultures were shaken at 200 oscillations/min. in a water bath, the slope of the rapid buildup in pressure curve was steep with maximum pressure responses occurring in about 4 to 5 hours. Shaken cultures showed a loss of pressure after about 3 to 4 hours in the leveling-off period with a continual gradual decline and represented a total loss of about 0.5 to 1.0 psi in 24 hours. The maximum amount of gas pressure recorded depended on incubation conditions and cultures. For all test conditions, *E. aerogenes* exhibited the highest pressure recordings with a mean of 3.70 psi per 10 ml of broth, followed by *C. intermedium* and *E. coli* with measurements of 2.70 and 2.10 psi per 10 ml of broth, respectively. In general, the highest values for the rate of pressure increase and for maximum pressure recordings, psi per 10 ml of broth, were, in order of decreasing intensities, (i) shaken water bath, (ii) stationary water bath, and (iii) stationary incubator conditions. When the three species were tested in 10 ml of LTB and shaken at 200 oscillations/min., incubation at 30°, 35° or 40°C. did not markedly influence shape of the gas pressure response curves but it did effect length of the lag period. Incubation at 40°C. reduced lag times for *E. coli* and *E aerogenes* by 1 to 2 hours as compared to incubation at 35°C. but no differences were noted for *C. intermedium* at these temperatures. For the three species tested, incubation at 30°C. increased lag times by 2 to 7 hours over 35° and 40°C., respectively. When lag times for all cultures were compared with inoculum size, at $10^6$ cells/ml the difference in lag times between 30° and 40°C. was 1.5 to 2 hours and at $10^0$ cells/ml this difference was 5 to 8 hours. This increased difference or spread in lag times as cell concentrations decreased was quite evident at 30°C. and to a lesser extent at 35° and 40°C. At 45°C., *E. aerogenes* and *C. intermedium* failed to grow in 24 hours at the inoculum levels tested. *Escherichia coil* lag periods at 45°C. for $10^6$ and $10^4$ cells/ml were 9 hours and 30 min. and 17 hours and 40 min., respectively, an increase of 5 to 11 hours over incubation at 35° and 40°C. At concentrations of $10^2$ and $10^0$ cells/ml, no growth of *E. coli* was evident in 24 hours at 45°C.

The number of cells present in 10 ml of LTB shaken at 200 oscillations/min., at the time of rapid buildup in pressure did not vary markedly among the three species tested. Studies at 35°C. with a wide range of inoculum levels from $10^0$ to $10^7$ cells/ml indicated that the mean cell concentration at pressure buildup for the three species tested was $6.50 \times 10^8$ cells/ml. When tested with *E. coli*, mean $CO_2$ concentrations, ppm, were: 2,000 at times of inoculation, 25,000 at pressure buildup, and 150,000 at time of maximum pressure reading. The interesting relationships between gas pressure, cell numbers and $CO_2$ concentrations, especially at the time of rapid buildup in pressure, are currently under investigation.

The data determined by the present invention indicates several practical applications of the pressure transducer system for detecting gas producing microorganisms. The first obvious application is the detection of coliform organisms in water samples. Based on the linear relationship between inoculum size and the time to rapid buildup in pressure, or detection time, the pressure transducer system could result in a simplified, one-tube test with the automatic recording of pressure buildup lending itself to operation by nonprofessionally trained personnel. The transducer concept also suggests the possibility of developing a remote, in situ sampling station for monitoring potential sources of pollution such as sewage discharge into bodies of water intended for drinking or other purposes. Another area of potential application is in the clinical laboratory where members of the Enterobacteriaceae group are responsible for the majority of urinary tract infections. As only samples containing in excess of 100,000 cells/ml are considered clinically important, the pressure transducer system could detect the majority of urinary tract infections in 5 hours or less, a considerable savings on time over the current 24 hours. Still other areas of application are in the food and dairy industries and in sterility testing programs. For example, in the fermentation industry, such as beverage alcohol (beer, wine, whiskey, etc.) the transducer method of the present invention could be used to check on the fermentation capabilities of the yeast cultures and also aid in monitoring various stages of production.

There are many modifications and variations of the invention that will be readily apparent to those skilled in the art in the light of the above teachings. For example, oven 11 may be omitted and rack 13 be designed to include a heated water or oil bath to provide the needed incubation temperatures for the test sample. This incubation period may be while rack 13 is stationary, shaken, or agitated in a conventional manner. Also, although specific growth media are disclosed it is obviously considered to be within the scope of the invention to utilize any growth media that permits growth of gas-producing microorganisms. These and other modifications and variations are considered possible in the light of the above teachings.

It is therefore to be understood that the invention may be practiced otherwise than as specifically described.

What is claimed as new and desired to be secured by Letters Patent of the United States is:

1. A method of quantifying the number of gas-producing microorganisms in a liquid sample comprising:
   diluting a specific quantity of a liquid sample believed to contain gas-producing mircroorganisms in a broth known to permit growth of gas-producing microorganisms,
   incubating the diluted sample under temperature and pressure conditions known to stimulate gas-producing microorganism growth, for a specific period of time,
   measuring the gas pressure produced by the incubated sample over an extended period of time in terms of an electrical signal,
   recording a plot of the electrical signal produced by the gas pressure over an extended period of time,
   wherein the recorded signal plot indicate a curve showing an initial lag period in which substantially no gas is evolved, followed by a rapid increase in pressure to a leveling off of pressure and wherein the lag period, the slope of the increase in pressure curve and the height of the level portion of the curve are all indicative of the number of microorganisms in the sample being tested.

2. The method of claim 1 wherein the gas-producing mircoorganisms are from the group consisting of the Enterobacteriaceae.

3. The method of claim 1 including the step of agitating the liquid sample during the incubation period.

4. The method of claim 1 wherein the broth known to permit growth of gas-producing microorganisms is selected from the group consisting of Lauryl tryptose broth, Eijkman lactose medium, Pheral red broth base with 0.5% lactose, phenyl red broth base with 1% glucose and Brilliant green bile broth.

5. The method of claim 1 wherein the incubation step is conducted at 35°C. for a period of 24 hours.

6. A method of rapidly detecting the presence of gas-producing microorganisms in a suspect sample comprising the steps of:
   adding the suspect sample to a closed container having a specific quantity of a broth known to stimulate microorganism growth,
   incubating the closed container under controlled time and temperature conditions known to promote microorganism growth,
   constantly measuring any increase in gas pressure within the closed container during incubation,
   converting the gas pressure measurements into a continuous electrical signal; and
   recording a plot of the electrical signal in terms of gas pressure produced with the recorded plot being indicative of the presence and quantity of microorganism within the sample being tested.

* * * * *